UNITED STATES PATENT OFFICE.

JAMES GOULD, OF LEXINGTON, MASSACHUSETTS.

FERTILIZER.

SPECIFICATION forming part of Letters Patent No. 277,023, dated May 8, 1883.

Application filed April 22, 1882. (No specimens.)

*To all whom it may concern:*

Be it known that I, JAMES GOULD, a citizen of the United States, residing at Lexington, in the county of Middlesex and State of Massachusetts, have invented certain new and useful Improvements in Fertilizers; and I do hereby declare the following to be a full, clear, and exact description of the invention, such as will enable others skilled in the art to which it appertains to make and use the same.

On the 27th day of February, 1866, Letters Patent of the United States No. 52,844 were issued to me for a fertilizer which was founded on the use of gas-lime in mixture with salt and animal and vegetable matter, or vegeto-animal matter, by which I render them of great utility in agriculture and horticulture, as, in addition to an effective fertilizer, I obtain an agent which destroys insects.

In the use of this patented fertilizer on an extended scale I have found that salicylic acid operates more effectually to destroy insect life than the carbolic acid, and in some respects is superior in its action upon vegetable life; and my present invention consists in the employment of salicylic acid with hydrocarbons in mixture with lime, salt, vegetable or animal matter, and ammonia.

In manufacturing my fertilizer I employ the following ingredients, in the proportions named: gas-lime from gas-works that use oyster-shells as a purifying agent, forty-five per cent.; animal matter, (night-soil or blood,) thirty per cent.; fermentable vegetable matter, (sumac, sea-weed, or leaves,) five per cent.; salt, five per cent.; alum, two and one-half per cent; salicylic acid, five per cent., and carbolic acid, seven and one-half per cent. These are thoroughly mixed with the exception of the alum, and during warm weather the mixture is moistened with ammonia-water from gas-works, which contains a greater or less percentage of coal-tar, ammonia-water being added from time to time to supply the moisture and hasten fermentation. When the heat of fermentation ceases, the acids and other products have combined with the lime, which has been rendered mild, much soluble matter has been formed, and the fertilizer is complete, with the exception that the alum, either in soluble form or in crystals, must be added.

I claim—

A fertilizer containing salicylic acid, gas-lime from gas-works using oyster-shell lime, animal matter, (night-soil or blood,) vegetable matter, (sumac, sea-weed, or leaves,) with salt, alum, and carbolic acid, substantially as stated.

In testimony whereof I affix my signature in presence of two witnesses.

JAMES GOULD.

Witnesses:
H. E. LODGE,
F. CURTIS.